April 1, 1969     E. G. MEYER     3,435,662
MEASURING CIRCUIT FOR A PARAMAGNETIC GAS ANALYZER
Filed July 27, 1965

INVENTOR.
EMILIO G. MEYER
BY
Brown, Critchlow, Flick & Peckham.
ATTORNEYS.

United States Patent Office 3,435,662
Patented Apr. 1, 1969

3,435,662
MEASURING CIRCUIT FOR A PARAMAGNETIC GAS ANALYZER
Emilio G. Meyer, Milan, Italy, assignor to Mine Safety Appliances Italiana S.p.A., Milan, Italy
Filed July 27, 1965, Ser. No. 475,188
Int. Cl. G01n 27/74
U.S. Cl. 73—27     6 Claims

ABSTRACT OF THE DISCLOSURE

This invention relates to a measuring circuit for a paramagnetic gas analyzer of the type in which the wind generating and adjacent filaments of the analyzer are connected in a Wheatstone bridge circuit. Means are provided for balancing the bridge under static conditions in the absence of a paramagnetic gas to compensate for thermal conductivity errors due to changes in composition of the background gases. The circuit also includes means for decreasing the unbalance of the bridge under dynamic conditions, resulting from the presence of a paramagnetic gas in the mixture, to the point at which the thermal conductivity error will be opposed in polarity and substantially equal in magnitude to the sum of the density, viscosity, and specific heat errors, caused by changes in the composition of the background gases under dynamic conditions.

---

The unique paramagnetic properties of oxygen have stimulated a number of investigations into methods of measuring oxygen concentration in gas mixtures by magnetic means. One type of instrument devised for this purpose operates on the principle that the magnetic susceptibility of oxygen varies inversely with its temperature and that, by heating a portion of an oxygen-containing mixture in a non-homogeneous magnetic field inside a test chamber, there is created a so-called "magnetic wind," which can be measured by its thermal effect on an electrical resistance element. The present invention relates to an improved electrical measuring circuit for use with an instrument of this general type, such as, for example, the instrument described in Patent No. 3,292,421 for Paramagnetic Gas Analyzer.

The paramagnetic gas analyzer referred to above includes a test chamber having a generally circular side wall and a plurality of magnetic field zones with lines of maximum magnetic force extending across circumferentially spaced portions of the chamber. A separate pair of elongated temperature sensitive electrical resistance filaments are disposed in the chamber in each magnetic field zone, there being preferably four such pairs in four such zones. Each filament extends lengthwise substantially normal to the direction of the lines of maximum magnetic force in its zone and extends widthwise substantially circumferentially of the chamber. The first filament of each pair belongs to one set of filaments, each of which is disposed in a region of the magnetic field where the product of the magnetic field intensity and of the circumferential magnetic field intensity gradient approaches a maximum. The second filament of each pair belongs to a second set of filaments, each of which is disposed parallel and adjacent to the first filament in a region of the magnetic field where the product of the magnetic field intensity and of the circumferential magnetic field intensity gradient approaches a minimum. Both sets of filaments are heated electrically to the same temperature in the absence of a paramagnetic gas, e.g., in the absence of oxygen but in the presence of a single, substantially non-magnetic background gas, such as nitrogen, or mixture of such background gas, generally present in the sample gas being analyzed. When a paramagnetic gas, such as oxygen, is added to such background gas or gases, there will be a thermomagnetic gas flow, the so-called "magnetic wind," circumferentially of the chamber in the direction of decreasing magnetic field intensity adjacent the first filament of each pair, i.e., in a direction from the first towards the second filament of each pair. The pairs of filaments are arranged to obtain cumulative gas flow in the same direction in the test chamber. As a result, the gas flow will transfer heat from the first set of filaments to the second set. An electrical circuit is provided for measuring the resulting difference in temperature between the two sets of filaments.

In general, the electrical circuit described in the patent referred to above includes a Wheatstone bridge network with its four arms represented by the four first and second filaments connected in such a way, with pairs of first filaments being balanced against pairs of second filaments, that the decrease in resistance of the first filaments (which, as the upstream filaments of each pair, are cooled by the magnetic wind and are herein referred to as C filaments) and the increase in resistance of the second filaments (which, as the downstream filaments of each pair, are warmed by the transfer of heat from the C filaments and are herein referred to as H filaments) will provide additive electrical responses to increase the signal readout. In other words, this bridge circuit is designed to provide maximum bridge unbalance in the presence of oxygen and that unbalance is characterized and measured by the temperature difference between two sets of filaments.

A disadvantage of the circuit just described is that it does not fully compensate for errors due to changes in the composition of the background gas or gases. For example, if the bridge is initially balanced in the presence of nitrogen alone, it will not remain balanced when carbon dioxide is substituted for nitrogen, because each of these gases has a different thermal conductivity (that of carbon dioxide being lower than that of nitrogen), so that the rate of heat loss from the filaments to the walls of the chamber will be different when one gas is substituted for the other. In theory, this should not unbalance the bridge, because a balanced Wheatstone bridge should remain balanced when all of the arms of that bridge are exposed to identical ambient conditions, even when those conditions vary, as in changing from one background gas to another. In practice, however, it is impossible to match identically each element of the bridge in terms of electrical, mechanical, and geometrical characteristics. Accordingly, the arms of a Wheatstone bridge will, in practice, have different sensitivities to variations in the ambient conditions to which they are exposed, even though those variations are identical for each arm.

Conditions become more complex when oxygen is added to the gas mixture. In the circuit described in the foregoing applications, the addition of oxygen to one or more background gases will create a circumferential gas flow within the test chamber, which, in turn, will create a temperature differential between the two sets of filaments. The C filaments will be cooled while the H filaments, in adjacent arms of the bridge, will be heated. (For example, as little as 5 percent oxygent in a mixture may create a temperature difference of as much as 6° C. between the C and H filaments, where their initial temperatures were the same and around 200° C. in the absence of oxygen.) Under these conditions of (1) dynamic gas flow in the test chamber and (2) a temperature differential between the two sets of filaments, each set of filaments will have a different sensitivity to variations in thermal conductivity, density, viscosity, and specific heat caused by changes in the composition of the background gases. The bridge will be unbalanced due to the presence of oxygen in the gas mixture, but the extent of that unbalance may not be an accurate measure of the oxygen content of the mixture.

In explanation of the above statement, it should be emphasized that there are two conditions under which the bridge must operate. One is a static condition, when oxygen is absent from the mixture and the background gas or gases surrounding the filaments, which form the arms of the bridge, are motionless. The other is a dynamic condition, when oxygen is present and, due to the magnetic wind it generates, the background gas or gases are in motion. Under static conditions when oxygen is absent, a change in the composition of the background gases surrounding the filaments unbalances the bridge solely because of the different thermal conductivity effects of the gases involved. (Thermal convection effects are considered as included in the thermal conductivity effects.) Under the dynamic conditions that prevail when oxygen is present, the pressure differential that causes the magnetic wind is a function solely of the oxygen concentration in the mixture, but what is actually measured to indicate the oxygen concentration is not that pressure differential but its effect in causing a temperature differential between two sets of filaments and that effect may be substantially modified by changes in the composition of the background gases. For example, for a given oxygen concentration there will be a given pressure differential that will create a magnetic wind, but the velocity of that wind will not be determined solely by the pressure differential but will vary inversely with the density and viscosity of the background gases; and, finally, the temperature differential of the filaments not only will vary directly with the velocity of the magnetic wind but also will vary inversely with the thermal conductivity and directly with the specific heat of the background gases.

As a specific example, assume that the Wheatstone bridge of the prior art circuit under discussion is balanced in the absence of oxygen and in the presence of nitrogen. As the background gas is changed from nitrogen to carbon dioxide, the bridge will no longer be balanced. By adjusting potentiometers in the bridge circuit, as described in the earlier applications referred to above, the different thermal conductivity effects of these two background gases can be minimized, so that the bridge remains balanced (i.e., no temperature difference between the two sets of filaments) in the absence of oxygen, whether the background gas is nitrogen or carbon dioxide. The effects of the background gases reassert themselves, however, as soon as oxygen is added to the sample. For example, the substitution of carbon dioxide for nitrogen in a mixture of less than 5 percent oxygen and more than 95 percent nitrogen will cause the following principal errors: (1) a thermal conductivity error—due to the lower thermal conductivity of carbon dioxide, its substitution for nitrogen will increase the temperature difference between the two sets of filaments; this may be characterized as a positive error, because the meter, which measures the degree of unbalance, will indicate a higher concentration of oxygen than is actually present; (2) a viscosity error—due to the higher viscosity of carbon dioxide, its substitution for nitrogen will decrease the velocity of the magnetic wind generated by the oxygen present, which in turn will decrease the heat transferred from one set of filaments to the other and thereby decrease the temperature differential between the two sets of filaments; this may be characterized as a negative error, because the meter will indicate a lower concentration of oxygen than is actually present; (3) a density error—due to the higher density of carbon dioxide, its substitution for nitrogen will decrease the velocity of the magnetic wind, and like the viscosity error, will be a negative error; (4) a specific heat error—due to the higher heat capacity of carbon dioxide, its substitution for nitrogen will cause more heat to be transferred from one set of filaments to the other and thereby increase the temperature differential between the two sets of filaments; this may be characterized as a positive error because it indicates a higher oxygen concentration than is actually present.

The cumulative effect of the errors enumerated above is a net positive error that may produce as much as a 49 percent increase in output signal or bridge unbalance for the same concentration of oxygen when the background gas is changed from nitrogen to carbon dioxide. Substantially one half of this error is represented by the thermal conductivity error and the other half by the sum of the other errors mentioned. If the change in background gases were reversed, i.e., from carbon dioxide to nitrogen, the polarity of the separate errors would also be reversed and the cumulative error would be negative. Other background gases will produce similar though different errors. For example, if methane were substituted for nitrogen in the same oxygen-nitrogen mixture described above, the thermal conductivity of methane being much higher than that of nitrogen, would produce a large negative error and the sum of the other errors would be a slightly smaller positive error, the cumulative error being a net negative error that might produce a 10 percent decrease in signal or bridge unbalance for the same concentration of oxygen when the background gas was changed from nitrogen to methane.

It is accordingly a principal object of the present invention to provide an electrical measuring circuit for use with a paramagnetic gas analyzer of the type described that will substantially fully compensate for the foregoing and similar errors due to changes in the composition of the background gases, not only in the absence of a paramagnetic gas, but also when a paramagnetic gas is present to create a magnetic wind or gas flow in the test chamber.

A further object is to provide automatic means for maintaining such compensation once the circuit has been adjusted for the background gases involved.

The foregoing and other objects will be apparent from the following description of a preferred embodiment of the invention in connection with the attached drawings, in which.

Figure 2:
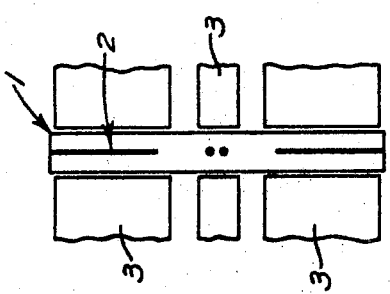
FIG. 2 is a diagrammatic side view of the chamber of FIG. 1.
Figure 1:
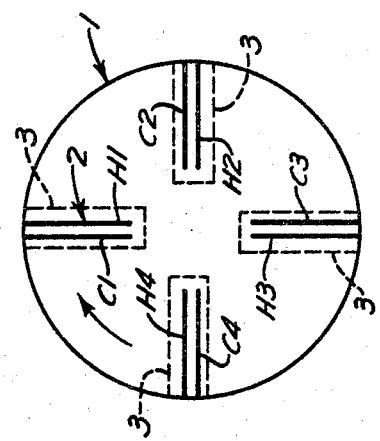
FIG. 1 is a diagrammatic front view of a cylindrical paramagnetic gas test chamber provided with four pairs of circumferentially spaced and radially extending filaments and their associated magnetic pole pieces.

Referring to the drawings, there is shown in FIGS. 1 and 2 a representative test chamber 1 of a paramagnetic gas analyzer of the type described in the patent referred to. This chamber is substantially cylindrical and is provided with four pairs of symmetrically disposed electrical resistance filaments 2 arranged in zones of magnetic flux, as described earlier herein. Magnetic pole pieces 3 connected to permanent magnets (not shown) produce the magnetic fields referred to. No attempt has been made in these figures to illustrate details of the test chamber or filaments, which are fully described in the patent referred to above. The filaments are divided into two sets identified by the letters C (representing the upstream filaments of each pair that are cooled by the magnetic wind) and H (representing the downstream filaments of each pair that are heated by the magnetic wind); and the individual filaments are further identified by appropriate subscripts $C_1$, $C_2$, $H_1$, $H_2$, etc. When oxygen is present in the test chamber, the magnetic wind is assumed to produce gas flow in a clockwise direction, as indicated by the directional arrow in FIG. 1.

Figure 3:
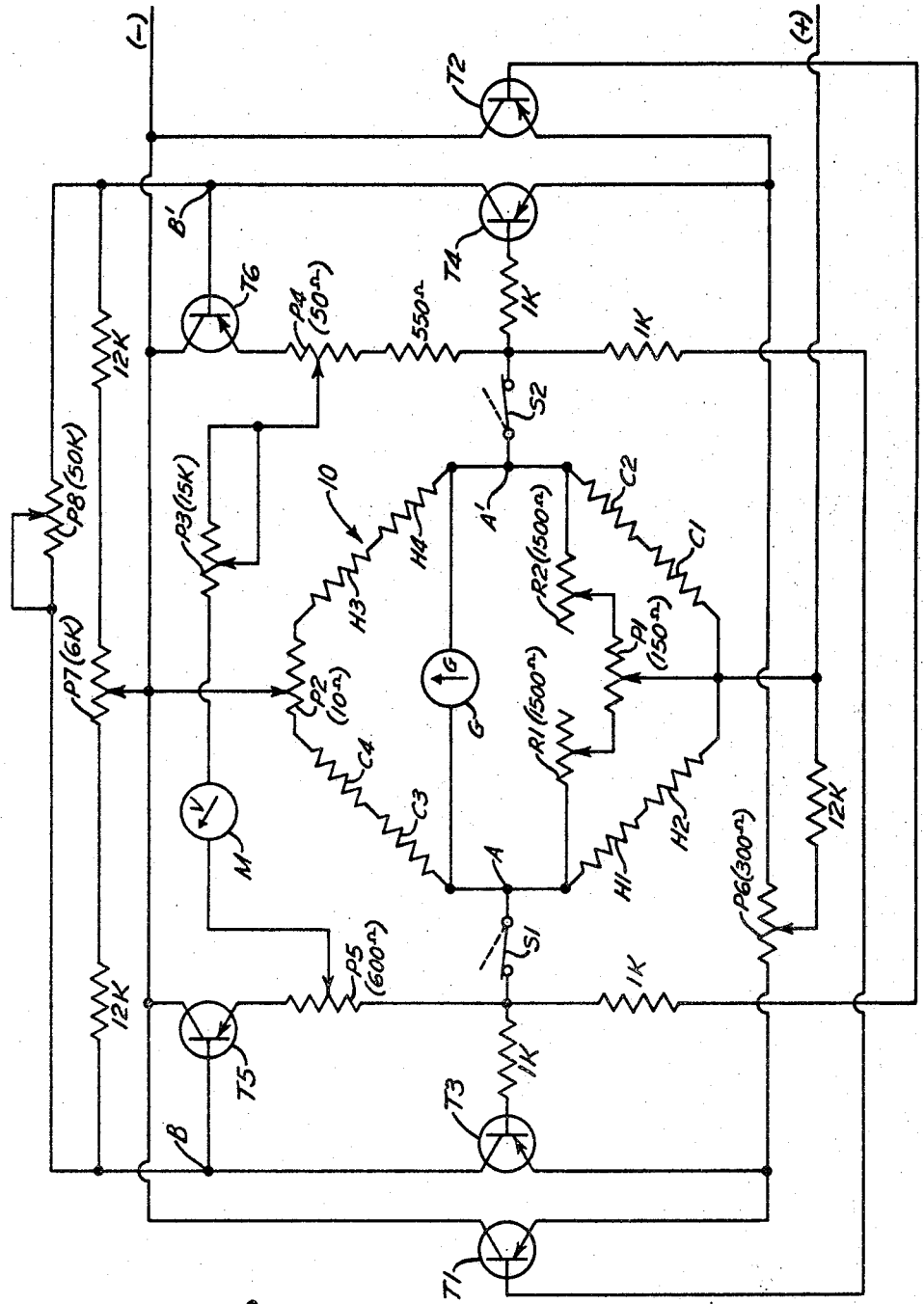
FIG. 3 is a schematic wiring diagram of the electrical measuring circuit that is the subject of the present invention, in which the filaments of FIGS. 1 and 2 form the arms of a Wheatstone bridge.

The electrical measuring circuit that is the subject of this invention is shown in FIG. 3. The circuit includes a Wheatstone bridge generally designated by the numeral 10, in which the resistance arms are the C and H filaments previously referred to and arranged so that pairs of C filaments are balanced against pairs of H filaments in adjacent arms. Since this circuit balances the C filaments as a set against the H filaments as a set, the order in which the C or H filaments are paired together is immaterial. The nominal cold resistance of each filament is about 50 ohms.

A variable resistance, consisting of a rheostat R1 (coarse adjustment) and part of a potentiometer P1 (fine adjustment), is connected across the H1–H2 filaments. Similarly, a variable resistance, consisting of a rheostat R2 (coarse adjustment) and the remaining part of potentiometer P1 (fine adjustment) is connected in parallel across the C1–C2 filaments. Any adjustment of these resistors that reduces the parallel resistance across one set of filaments has the effect of reducing the current through those filaments, thereby reducing their sensitivity. Conversely, an adjustment increasing either shunt resistance has the opposite effect. Between the upper arms of the bridge, a potentiometer P2 is connected in series with the adjacent filaments C3–C4 and H3–H4. An adjustment of this potentiometer decreasing its resistance in series with one of the adjacent filaments has the effect of increasing the current through those filaments, thereby increasing their sensitivity.

By combining adjustments of the above shunt and series resistors, the bridge circuit may, in the absence of oxygen, be compensated for thermal conductivity errors due to changes in the composition of the background gases. One way of doing this is to isolate the bridge from the rest of the circuit by opening switches S1 and S2. Test chamber 1 is then successively flushed first with one background gas (e.g., 100 percent nitrogen) and then with a second background gas (e.g., 100 percent carbon dioxide), the bridge being balanced after the introduction of each gas, in accordance with the following procedure. (1) With nitrogen in the test chamber, adjust one of the variable resistors, say P2, until the galvanometer G, which is connected across the output terminals A–A' of the bridge, indicates zero. (2) After introducing carbon dioxide into the chamber, the bridge will be unbalanced; observe the reading of G (say it reads −50), and then rebalance the bridge by adjusting the other variable resistor P1 until G again indicates zero. (3) Again fill the chamber with nitrogen and observe the reading of G (say it is −30); if the difference between the two readings is less than the first reading (as it is in the stated case), the correct resistors are being adjusted, since the bridge is moving towards ultimate balance with both gases; and the bridge is again rebalanced in the presence of nitrogen by adjusting P2 until G reads zero. (On the other hand, if the difference between the two readings is greater than the first reading, then the adujstments should be reversed, i.e., P1 should be adjusted in the presence of nitrogen and P2 in the presence of carbon dioxide.) (4) The bridge is ultimately brought into complete balance, regardless of which of the two background gases is present in the chamber, by alternating adjustments of P1 in the presence of carbon dioxide and adjustments of P2 in the presence of nitrogen.

The procedure described above for compensating for the thermal conductivity effects of the background gases is effective only so long as the bridge remains in balance without gas flow around the filaments. When oxygen is added, neither of these conditions exists: a magnetic wind is produced and, in turn, produces a temperature differential between the two sets of filaments that not only unbalances the bridge but also modifies the sensitivities of the filaments to thermal conductivity effects, thereby introducing the thermal conductivity and other errors, described above, that are associated with filament temperature differential and gas flow. The present invention, however, provides a method and means for automatically adjusting the bridge, as the oxygen concentration in the mixture varies, to that point at which the thermal conductivity error due to changes in background gas composition is so far compensated (or overcompensated) as to substantially offset the sum of the other errors previously referred to. The amount of correction applied to the bridge to keep it adjusted at that point is used to measure the oxygen concentration.

The adjustment referred to above is applied to a bridge that has been balanced, in the absence of oxygen, to compensate fully for the thermal conductivity effects due to changes in background gas composition, as previously described. An amplifier-feedback circuit adjusts the current in the arms of the bridge to bring them more or less into balance at that point at which the thermal conductivity error is so far compensated (or overcompensated) as to substantially compensate for the other errors in question. The amplifier feedback circuit includes transistors T1–T6, a voltmeter M calibrated in percentage of oxygen, a calibrating potentiometer P3, zeroing potentiometers P4 (fine adjustment) and P5 (coarse adjustment), drift correction potentiometers P6 and P7 inserted to compensate for the drift of the amplifier circuit with changes in the ambient temperature, a potentiometer P8 for adjusting the gain of the amplifier circuit, and miscellaneous fixed resistors shown in the wiring diagram of FIG. 3. The resistors have the values shown; the transistors are silicon type BCZ10 or their equivalent.

In the presence of oxygen, the bridge becomes unbalanced, as noted above. Point A tends to become more negative, and point A' tends to become more positive, assuming the polarity of the direct current source applied to the bridge to be as shown in FIG. 3. The signal from A drives the base of transistor T3 more negative, and the signal from A' drives the base of transistor T4 more positive. T3 will then conduct more current and T4 less current. Point B will therefore become more positive and B' more negative. As a result less current will be conducted through transistor T5 and more current through transistor T6. The decreased current through transistor T5 is equivalent to an increase in the shunting resistance that includes potentiometer P5 across the C3–C4 filaments in the upper left arm of the bridge. Similarly, the increased current through transistor T6 is equivalent to a decrease in the shunting resistance that includes potentiometer P4 across the H3–H4 filaments in the upper right arm of the bridge. Moreover, as the current through the C3–C4 filaments increases, the current through the H1–H2 filaments in the adjacent arm decreases; and, on the other side of the bridge, as the current through the H3–H4 filaments decreases, the current through the C1–C2 filaments in the adjacent arm increases. Transistors T1 and T2 are inserted in the circuit to increase stability and gain. The resistance loop that includes transistor T5 and the similar loop that includes transistor T6 are feedback loops that, under proper conditions of gain, will restore the bridge circuit to some pre-established condition that may or may not be a balanced one. It is this feature of the circuit that is used, in accordance with the present invention, to compensate for the errors noted herein due to changes in the composition of the background gases in the presence of oxygen.

In illustration of the above, suppose that, in the intended use of the paramagnetic gas analyzer, the composition of the background gases may vary from all nitrogen to all carbon dioxide and that the oxygen concentration may vary from 5 percent to 20 percent. After the bridge has been initially balanced for each background gas, in the absence of oxygen, as previously described herein, the amplifier-feedback circuit is then adjusted in accordance with the following procedure. A mixture of, say, 10 percent oxygen and 90 percent nitrogen is introduced into the test chamber, and the reading of meter M is observed. (The correspondence of that reading with the known concentration of oxygen in the mixture is not, for the moment, of any importance.)

The chamber is then filled with 10 percent oxygen and 90 percent carbon dioxide, and the gain of the amplifier circuit is adjusted by moving the slider of potentiometer P8 until meter M reads the same as before. These two steps are repeated until the meter shows the same reading, regardless of which background gas is present in the mixture. Next, potentiometer P3 is adjusted to calibrate meter M to read 10 percent oxygen, corresponding to the actual oxygen concentration in the sample. Thereafter, as the oxygen concentration varies in a mixture containing one or both of the background gases, nitrogen and carbon dioxide, the bridge circuit will be automatically maintained at the point established by the adjusting procedure just described. This point is the one at which the thermal conductivity error associated with the specific background gases involved will substantially offset the other errors associated with those same gases.

As previously indicated, when the background gases are limited to nitrogen and carbon dioxide, substantially one half of the cumulative error is represented by the thermal conductivity error and the other half by the sum of the other errors that have been referred to. Accordingly, when the gain of the amplifier-feedback circuit is adjusted to compensate for these errors, the bridge is thereby adjusted to the point at which the thermal conductivity error is actually overcompensated; its magnitude is about the same but its sign is reversed from positive to negative, thereby offsetting the sum of the other errors involved that have the same magnitude but are of opposite (positive) sign. It so happens that, because of the high gain required to compensate in this way for nitrogen and carbon dioxide as the background gases, the bridge will actually be balanced. This, however, is an exceptional case and is not likely to occur with combinations of other background gases. For example, if the background gases are nitrogen and methane and the bridge is initially balanced for each of them, in the absence of oxygen, as herein described, and if then, in the presence of oxygen, methane is substituted for nitrogen, the cumulative error due to this substitution will be negative and amount to about 10 percent. This error is composed of a negative thermal conductivity error of about 104 percent and a positive error of about 94 percent representing the sum of the other errors. Since this thermal conductivity error is already opposite in sign from and not much larger in magnitude than the sum of the other errors, only a slight adjustment need be made in the bridge to decrease the thermal conductivity error to the point at which it will offset the sum of the other errors. In this case, therefore, the gain of the amplifier-feedback circuit should be relatively low. The low gain desired is obtained by adjusting potentiometer P8 so that its effective resistance will be fairly small and thereby partially short circuit the bases of the two feedback transistor T5 and T6. The bridge will therefore be substantially unbalanced in the presence of oxygen, but will nevertheless fully compensate for the errors mentioned.

Although the examples cited herein have been limited to mixtures containing only two background gases and to changes in the composition of such mixtures in which one of those gases was completely substituted for the other, it will be apparent that this invention is equally applicable to mixtures of two or more background gases and to variations in the composition of such mixtures. Furthermore, it will be evident that the compensation provided by this invention will be more complete if the adjustments of the bridge and amplifier-feedback circuits are limited to such changes in the composition of the background gases that are expected to be met in actual use, rather than the entire range over which such compositions may vary.

Figure 4:
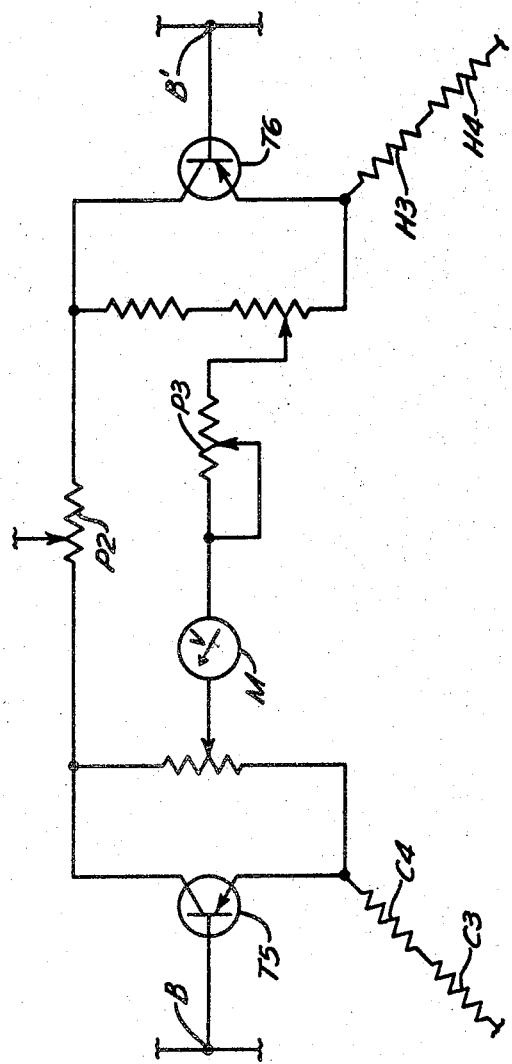
FIG. 4 is a fragmentary, schematic wiring diagram showing a modification of the electrical circuit of FIG. 3.

Under certain conditions when the thermal conductivity error is opposite in polarity from and smaller in magnitude than the sum of the other errors, the value of the thermal conductivity error must be increased without change of polarity in order to compensate for the other errors. In such case, the two feedback transistors T5 and T6 are connected in series (instead of in parallel) with filaments C3-C4 and H3-H4, as shown in the modified fragmentary circuit of FIG. 4. The reasons for this are (1) that increasing or decreasing a series resistance has an effect on the adjacent filaments that is opposite to the effect of increasing or decreasing a resistance in parallel with those filaments; and (2) that all adjustments to compensate for the errors under discussion must be adjustments that bring the bridge nearer to a balanced condition in the presence of oxygen, otherwise the operation of the feedback circuit would not tend towards a stabilized condition.

To summarize, the compensation provided by this invention in a Wheatstone bridge measuring circuit involves (1) balancing the bridge under static conditions in the absence of a paramagnetic gas to compensate for thermal conductivity errors alone due to changes in composition of the background gases and (2) an adjustment of the thermal conductivity error under dynamic conditions in the presence of a paramagnetic gas to the point at which the thermal conductivity error will be opposed in polarity and substantially equal in magnitude to the sum of the other errors involved due to changes in composition of the background gases, this latter adjustment always being made in a direction that tends towards, but does not necessarily attain, rebalancing of the bridge. The amount of correction applied to the bridge to keep it adjusted at said point as the paramagnetic gas concentration varies is used to measure that concentration.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a paramagnetic gas analyzer of the type described that includes a Wheatstone bridge network with its four arms represented by wind generating and adjacent filaments connected in such a way that the wind generating filaments are balanced against the adjacent filaments, an improved circuit for measuring the concentration of a paramagnetic gas in a gas mixture containing said paramagnetic and also substantially nonmagnetic background gases and at the same time compensating for the cumulative thermal conductivity, density, viscosity and specific heat errors due to changes in the composition of said background gases, said circuit comprising: an adjustable parallel resistor connected across each of two adjacent arms of the bridge and an adjustable series resistor connected between the two other adjacent arms of the bridge for balancing the bridge under static conditions in the absence of a paramagnetic gas but in the presence of said background gases and regardless of changes in the composition of those gases, thereby compensating for thermal conductivity errors due to such changes, correcting means for correcting the unbalance of the bridge under dynamic conditions resulting from the presence of a paramagnetic gas in the mixture, said correcting means applying opposite current corrections to adjacent arms of the bridge to decrease the bridge unbalance under said dynamic conditions to the point at which the thermal conductivity error will be opposed in polarity and substantially equal in magnitude to the sum of said other errors, and means for measuring the amount of the correction so applied to the bridge for indicating the concentration of the paramagnetic gas in the mixture.

2. Apparatus according to claim 1, in which said adjustable parallel resistor includes a potentiometer having its full resistance connected across the two outputs of the bridge and having its adjustable slider connected to one side of the current input to the bridge, and in which said series resistor includes a second potentiometer having its full resistance connected between said two other adjacent arms of the bridge and having its adjustable slider connected to the other side of the current input to the bridge.

3. Apparatus according to claim 1, in which said correcting means include an amplifier-feedback circuit having correcting portions that apply opposite corrections to adjacent arms of the bridge and are connected in parallel with those arms.

4. Apparatus according to claim 1, in which said correcting means include an amplifier-feedback circuit.

5. Apparatus according to claim 4 that also includes means for adjusting the gain of the amplifier-feedback circuit to control the degree of unbalance of the bridge.

6. In a paramagnetic gas analyzer of the type described that includes a Wheatstone bridge network with its four arms represented by wind generating and adjacent filaments connected in such a way that the wind generating filaments are balanced against the adjacent filaments, an improved circuit for measuring the concentration of a paramagnetic gas in a gas mixture containing said paramagnetic and also substantially nonmagnetic background gases and at the same time compensating for the cumulative thermal conductivity, density, viscosity and specific heat errors due to changes in the composition of said background gases, said circuit comprising: adjustable resistance means connected to the bridge for balancing the bridge under static conditions in the absence of a paramagnetic gas but in the presence of said background gases and regardless of changes in the composition of those gases, thereby compensating for thermal conductivity errors due to such changes, correcting means for correcting the unbalance of the bridge under dynamic conditions resulting from the presence of a paramagnetic gas in the mixture, said correcting means applying opposite current corrections to adjacent arms of the bridge to decrease the bridge unbalance under said dynamic conditions to the point at which the thermal conductivity error will be opposed in polarity and substantially equal in magnitude to the sum of said other errors, and means for measuring the amount of the correction so applied to the bridge for indicating the concentration of the paramagnetic gas in the mixture.

References Cited

UNITED STATES PATENTS

| | | | |
|---|---|---|---|
| 2,565,230 | 8/1951 | Hebler | 73—27 |
| 2,759,354 | 8/1956 | Cherry et al. | 73—27 |
| 2,782,102 | 2/1957 | Howe | 73—27 |
| 3,184,954 | 5/1965 | Klein | 73—27.5 |

RICHARD C. QUEISSER, *Primary Examiner.*

C. T. McCLELLAND, *Assistant Examiner.*